United States Patent [19]

Holden et al.

[11] Patent Number: 4,920,295
[45] Date of Patent: Apr. 24, 1990

[54] ALTERNATOR

[76] Inventors: Karel Holden; Ladislava Holdenova, both of Bleekhofstraat 27, 2018 Antwerp, Belgium

[21] Appl. No.: 230,534

[22] Filed: Aug. 10, 1988

[30] Foreign Application Priority Data

Aug. 10, 1987 [BE] Belgium ............................ 08700892

[51] Int. Cl.$^5$ .......................................... H02K 23/44
[52] U.S. Cl. .................................. 310/209; 310/68 E; 310/191; 322/30; 388/835
[58] Field of Search ..................... 310/68 E, 191, 193, 310/209, 156, 254, 261; 388/816, 835, 826; 318/739; 322/30, 49; 73/535, 550; 200/80 R

[56] References Cited

U.S. PATENT DOCUMENTS

| 646,309 | 3/1900 | Neeley | 310/209 |
| 1,039,197 | 9/1912 | Roth et al. | 310/209 |
| 1,194,645 | 8/1916 | Lincoln | 388/835 |
| 1,763,104 | 6/1930 | Shurtleff | 388/816 |
| 1,935,005 | 11/1933 | Ash et al. | 388/835 |
| 1,979,445 | 11/1934 | Bradford | 200/80 R |
| 2,072,008 | 2/1937 | Miller | 388/835 |
| 2,492,810 | 12/1949 | McDermott | 322/30 |
| 3,299,335 | 1/1967 | Wessels | 310/156 |

FOREIGN PATENT DOCUMENTS

| 0839224 | 4/1952 | Fed. Rep. of Germany | 310/209 |
| 1088600 | 9/1960 | Fed. Rep. of Germany | 310/209 |
| 1009925 | 3/1952 | France | 310/209 |
| 0626470 | 9/1978 | U.S.S.R. | 310/191 |
| 0733975 | 7/1955 | United Kingdom | 310/209 |

Primary Examiner—R. Skudy
Attorney, Agent, or Firm—William A. Drucker

[57] ABSTRACT

An alternator or synchronous generator, principally for supplying electrical current to batteries and other apparatus in cars, ships, aeroplanes and other devices for transport. The alternator consists primarily of a hollow stator with windings of which the inner shell is conical, a rotor with a conical outer shell which operates in conjunction with the conical inner shell of the stator, a shaft which rotates in the housing of the alternator, a slide between the shaft and the rotor for the axial motion of the rotor over the shaft and in the stator for the purpose of current control, a device for sliding the rotor over the shaft into the stator, a device for sliding the rotor over the shaft out of the stator, and, on the rotating shaft a centrifugal voltage controller for fine-adjusting the means which slides the rotor out of the stator and keeps the induced current voltage the same.

3 Claims, 3 Drawing Sheets

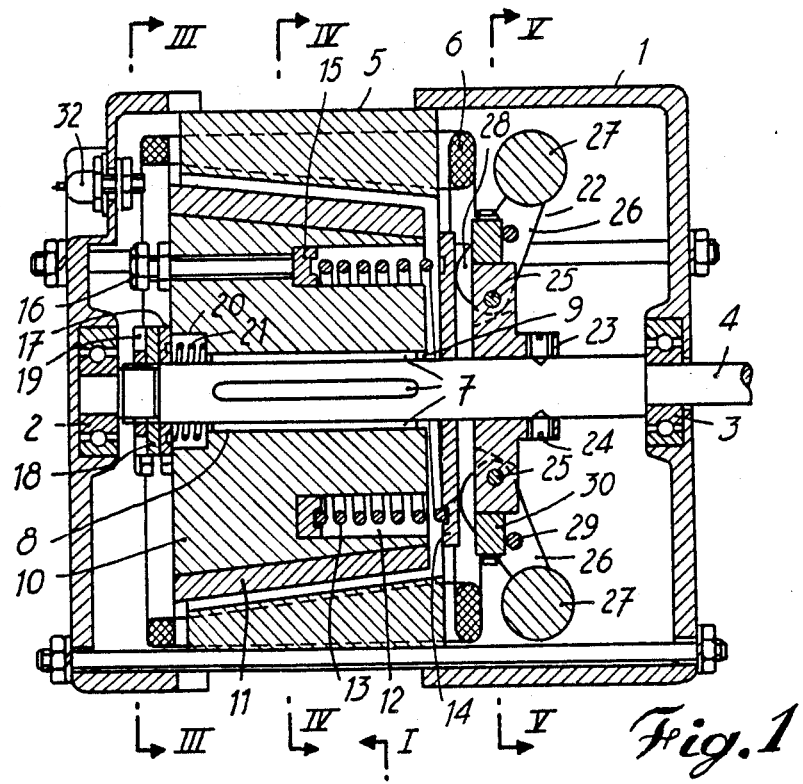
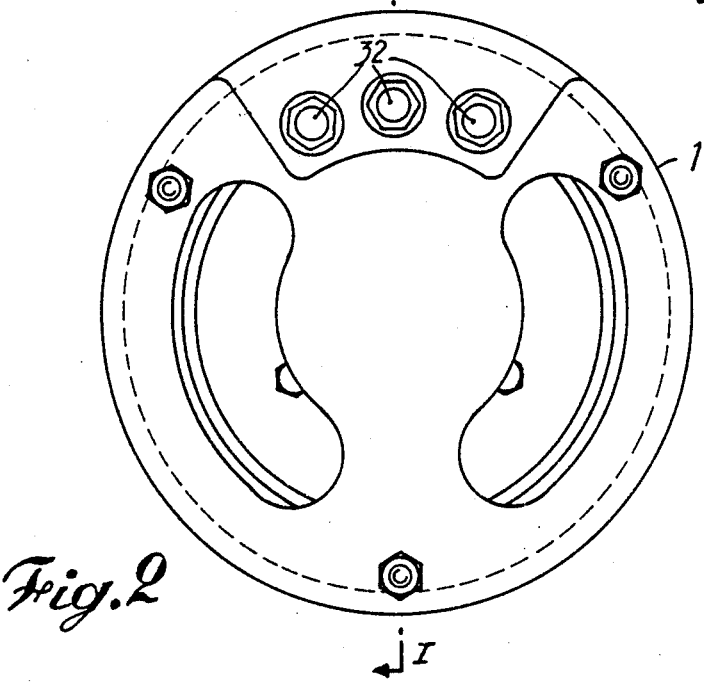

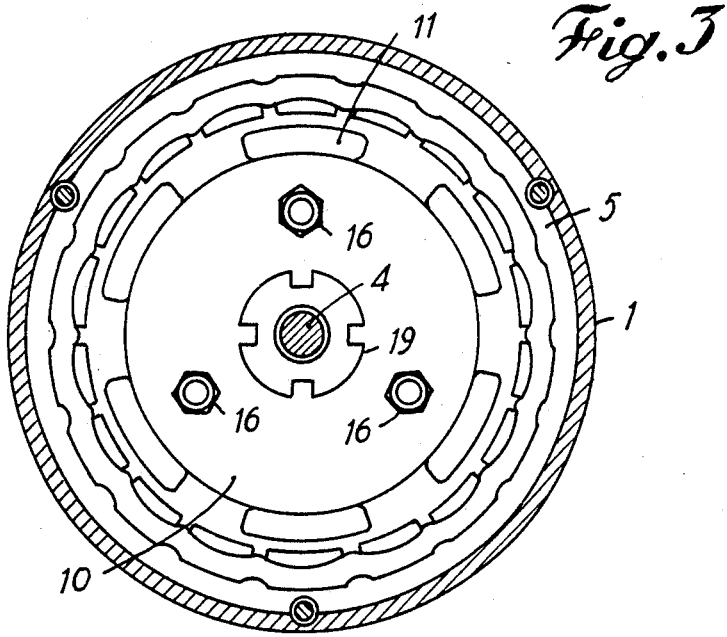
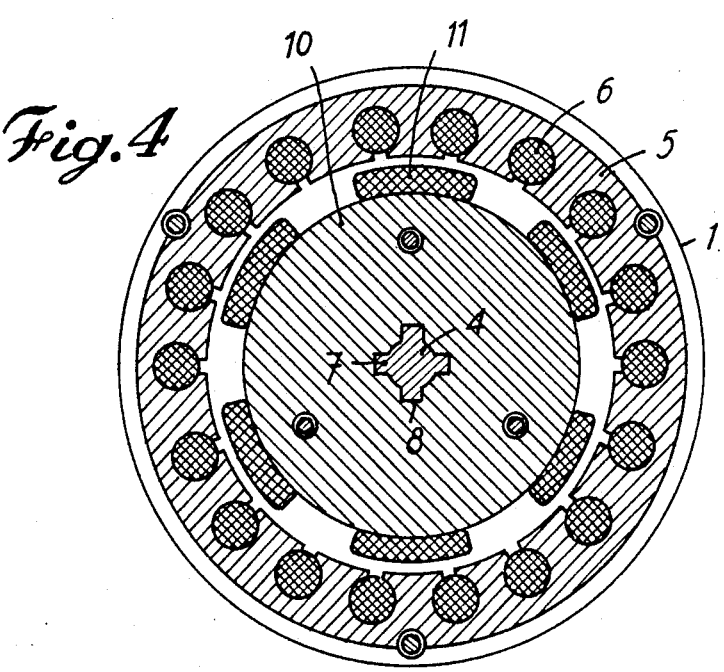

ALTERNATOR

The invention is for an alternator or synchronous generator, principally for supplying electrical current to batteries and other apparatus in cars, ships, aeroplanes and other means of transport.

In a known alternator use is made among other things of a rotor winding, carbon brushes and a relatively complicated current and voltage controller. In this alternator the current and voltage controller is dependent on a control relay and the current input in the rotor winding. A disadvantage of this is that in the event of a defect in the relay this gives rise in a short period of time to a disturbance in the alternator, the battery or in other equipment.

In the alternator pursuant to the invention these advantages are countered by the fact that the rotor winding and the carbon brushes are dispensed with and the relatively complicated current and voltage controller is simplified.

Moreover this alternator has the advantage that it can be constructed relatively cheaply because the aforementioned parts are dispensed with and permanent magnets are used in the rotor. Another advantage is that the alternator works smoothly in all circumstances regardless of the speed of revolution of the motors of the means of transport which are to be supplied.

The principle characteristic of this alternator is described in claim no. 1 following below.

As an example, but without in any way attempting to be exhaustive, a more detailed description of a preferred embodiment of the alternator in accordance with the invention is given below. This description refers to the attached drawings where:

FIG. 1 is a vertical section of the alternator along the line I—I of FIG. 2;

FIG. 2 is a front elevation of the alternator;

FIGS. 3, 4 and 5 are cross sections of the alternator, along lines III—III, IV—IV and V—V of FIG. 1 respectively.

Figure 5:
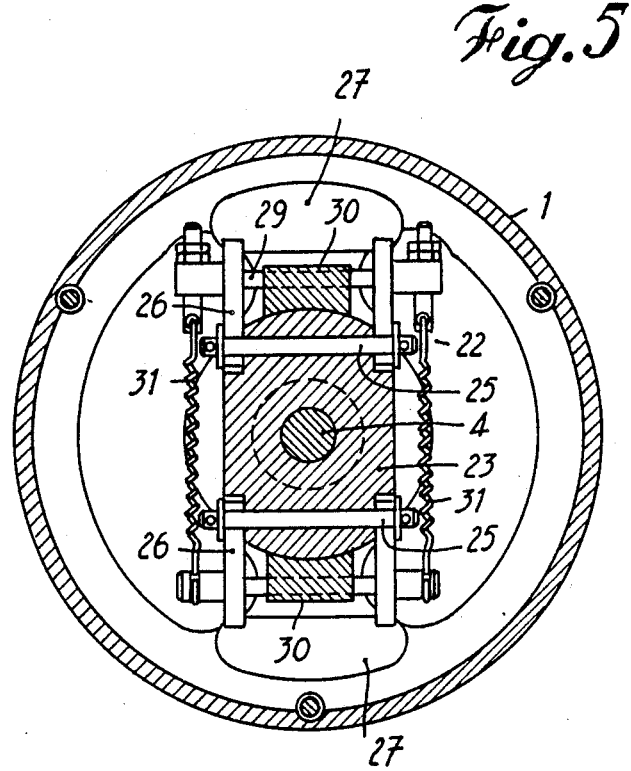

In these figures it can be seen that the alternator has a housing 1 in which two roller bearings 2-3 are installed in which a rotating shaft 4 rests. Furthermore in this housing there is a stator 5 with windings 6 for three-phase alternating current the inner shell of which is conical in form. On shaft 4 four sunk keys 7 are arranged in cross form over which four keyways 8 arranged in cross form fit which have been provided in the central opening 9 of the conical rotor 10 which is provided with built-in permanent magnets 11 of alternating polarity. As a result rotor 10 is mounted to the shaft 4 in such a way that it can rotate and slide axially along the shaft, which means that the distance between the rotor and the stator is variable, so that the magnetizing current and consequently the current of induction can be adjusted. In the rotor a chamber 12 is provided which contains a main compression spring 13 which on the one hand presses against a thrust plate 14 applied over the shaft 4 and on the other hand presses against a thrust ring 15 which can be shifted by means of setting bolts 16 in the chamber 12 in order to adjust the pressure of the main spring 13. This main compression spring presses the rotor 10 out of the stator 5 until is meets a disc 17 mounted on the shaft which itself is retained on the shaft by an intermediate disc 18 and a nut 19. In the rotor 10 a second chamber 20 is provided in which an auxiliary compression spring 21 weaker than the main spring 13 is installed and which presses on the one hand against rotor 10 and on the other hand presses against disc 17, in such a way that this spring tries to push the rotor in the direction of the stator. On shaft 4 a centrifugal voltage controller 22 for adjusting the voltage of the supply current is installed. This controller consists of a collar 23 which is held in position by means of screws 24 on shaft 4. Two pairs of arms 26 swivelling on spindles 25 and both provided with a weight 27 are mounted on this collar. Each arm has a cam end 28 which operates in conjunction with the thrust plate 14. The position furthest from the shaft of each weight 27 is limited by a striker 29 which operates in conjunction with a striker plate 30 on the collar. Two tension springs 31 are attached between the two pairs of arms 26 and which subject them to tension. On the front the alternator is provided with rectifiers of a known type 32 for the conversion of the three-phase alternating current into direct current.

When the rotor 10 starts to turn, current is excited in the stator winding by induction. The strength of the current depends on the speed of rotation of the rotor. During rotation the main compression spring 13 presses rotor 10 out of the stator 5 causing the distance between rotor and stator to increase. As a result the magnetization current diminishes and consequently so does the current induction in the stator winding. When current consumption is increased a larger quantity of current flows through the winding resulting in a greater reaction force which causes rotor 10 to shift over shaft 4 towards stator 5 with the assistance of the auxiliary spring 21. This reduces the distance between rotor 10 and stator 5 so that the magnetization current increases in strength just as the current induction does. As the speed of revolution of shaft 4 and rotor 10 increases, arms 26 and weights 27 of voltage controller 22 open outwards around the spindles 25 under the effect of centrifugal force, so that the cam ends 2B of arms 26 exert more pressure on thrust plate 14 and consequently on main compression spring 13. As this compression spring is more compressed rotor 10 will slide out of the stator, so that the distance between both increases and the voltage of induced current voltage decreases. The voltage controller thus ensures that for differing speeds of the shaft and rotor and differing current consumptions the induced current voltage remains the same.

It goes without saying that the form, dimensions and mutual disposition of the components described above can differ and that moreover some of these components could be replaced by others which have the same purpose.

I claim:

1. Alternator, comprising in combination a housing, a hollow stator with windings fixed in said housing and having a conical inner shell, an axial rotary shaft in said housing, a rotor with a conical outer shell on said shaft and operating in conjunction with the conical inner shell of said stator, a slide between the shaft and the rotor for the axial motion of said rotor over the shaft and in said stator for the current control, a disc mounted on said shaft and dispersed near one end of said rotor, a compression spring for sliding said rotor over the shaft into said stator and arranged between said rotor and disc, a thrust plate movable over the shaft and disposed near the other end of said rotor, a thrust ring arranged around said shaft, a compression spring for sliding said rotor over the shaft out of the stator and arranged between said thrust plate and thrust ring, setting bolts working in conjunction with said thrust ring for the adjustment of the compression of said compression spring, and a centrifugal voltage controller for fine-adjusting the compression of said compression spring sliding said rotor out of the stator and keeping the induced current voltage the same, said controller fixed on said shaft and having swivel arms with weights to exert a pressure on the adjacent thrust plate and compression spring.

2. Alternator as defined in claim 1 in which the rotor has an axial chamber, housing the thrust ring and one end of the compression spring arranged between the thrust plate movable over the shaft and said thrust ring, said thrust ring being fixed to the setting bolts.

3. Alternator as defined in claim 1 in which the centrifugal voltage controller consists of a collar fixed on the rotary shaft, two pairs of arms with weights pivotally secured on said collar, a striker plate for each pair of arms and mounted on said collar, a striker between each pair of arms and operating in conjunction with said striker plate to limit the extreme positions of said arms with weights, a pair of draw springs between said two pairs of arms, each arm provided with a cam end operating in conjunction with the thrust plate free movable over the shaft.

* * * * *